United States Patent [19]

du Quesne

[11] 4,258,777

[45] Mar. 31, 1981

[54] MECHANISM FOR ADJUSTING THE POSITION OF THE TOOL CARRIER ARM OF AN APPLIANCE FOR FITTING A TIRE ON THE RIM OF A WHEEL AND FOR REMOVING A TIRE FROM THE RIM OF A WHEEL

[76] Inventor: Francis du Quesne, Cleistraat 138, B-2630 Aartselaar, Belgium

[21] Appl. No.: 51,160

[22] Filed: Jun. 22, 1979

[30] Foreign Application Priority Data

Jun. 27, 1978 [BE] Belgium ................................ 57098

[51] Int. Cl.³ .............................................. B60C 25/08
[52] U.S. Cl. .................................................. 157/1.24
[58] Field of Search ....................... 157/1.17, 1.22, 1.24

[56] References Cited

U.S. PATENT DOCUMENTS 3,791,434  2/1974  du Quesne ........................... 157/1.24
3,858,637  1/1975  du Quesne ........................... 157/1.24

FOREIGN PATENT DOCUMENTS 1064527  4/1967  United Kingdom ..................... 157/1.24

*Primary Examiner*—James G. Smith
*Attorney, Agent, or Firm*—Stevens, Davis, Miller & Mosher

[57] ABSTRACT

The appliance comprises a rotatably mounted plate with clamps, a vertical pillar, an arm mounted on this pillar, which arm is pivotable in a horizontal plane above said plate. A bar extending downwards from said arm carries at its lower end a guiding wheel and a pressure wheel. An eccentric is mounted between the vertical pillar and the pivoting arm and permits to pivot the arm for adjusting the position of the pressure wheel at a small distance from the rim of a wheel clamped in the clamps.

6 Claims, 4 Drawing Figures

MECHANISM FOR ADJUSTING THE POSITION OF THE TOOL CARRIER ARM OF AN APPLIANCE FOR FITTING A TIRE ON THE RIM OF A WHEEL AND FOR REMOVING A TIRE FROM THE RIM OF A WHEEL

BACKGROUND

Appliances are well known for fitting a tire on a wheel and for removing a tire from a wheel, which comprise a horizontal rotatably mounted plate with clamps that can be moved towards the center of the plate in order to clamp the wheel, a vertical pillar on which is provided an arm with an oscillating motion in a horizontal plane above the aforesaid plate and in the aforesaid arm a bar, the level of which is adjustable, having at its lower end a small guiding wheel for separating the bead of the tire over the wheel rim, and also a small pressure wheel for driving the bead of the tire into the groove of the wheel rim, which pressure wheel is located along the circumference of the wheel.

In a known appliance there is provided on the vertical pillar a bracket in which is being screwed an adjusting screw with a small handwheel; the free end of said screw presses against the pivoting arm. After the arm has been turned so that the side of the small pressure wheel contacts the wheel rim, the adjusting screw is being turned so that the arm, and thus the small pressure wheel, parts and is set at a small distance from the wheel rim, resulting in the small wheel not being able to rub against the rim and damage it when the plate rotates.

This adjusting screw, however, has a drawback in that it is necessary to have the small handwheel make several revolutions before the small pressure wheel reaches the desired position. Thus, adjustment of the small pressure wheel cannot be achieved rapidly.

THE INVENTION

In order to obviate the aforesaid drawback and thus to obtain an easy and rapid adjustment of the position of the small pressure wheel in relation to the wheel rim, there is provided, according to the main characteristic of the invention, an eccentric rotatably mounted between the pillar and the pivoting arm for pivoting slightly the arm with respect to the pillar.

Hereafter will be given a detailed specification of a preferred embodiment of the appliance according to the invention, which specification will be given as an example without any limiting character whatsoever.

THE DRAWINGS

This specification refers to the attached drawings, in which

DESCRIPTION OF THE PREFERRED EMBODIMENT

Figure 1:
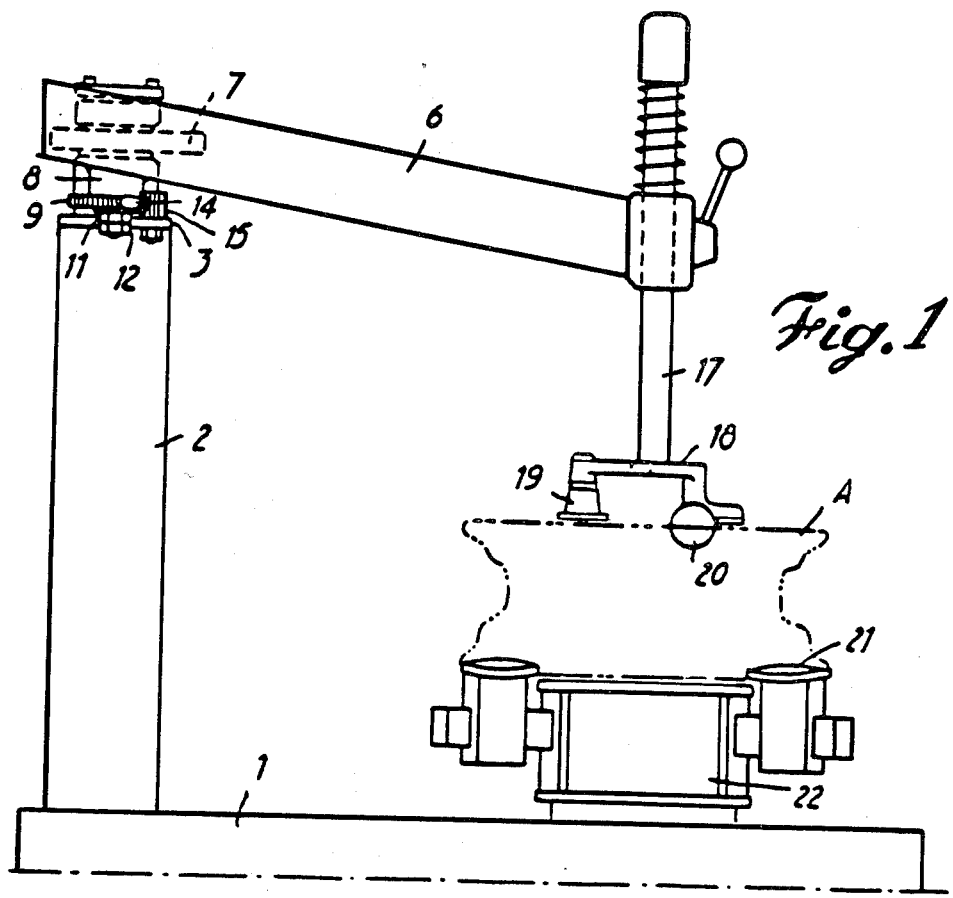
FIG. 1 shows a side view of the upper part of an appliance for fitting on tires.
Figure 2:
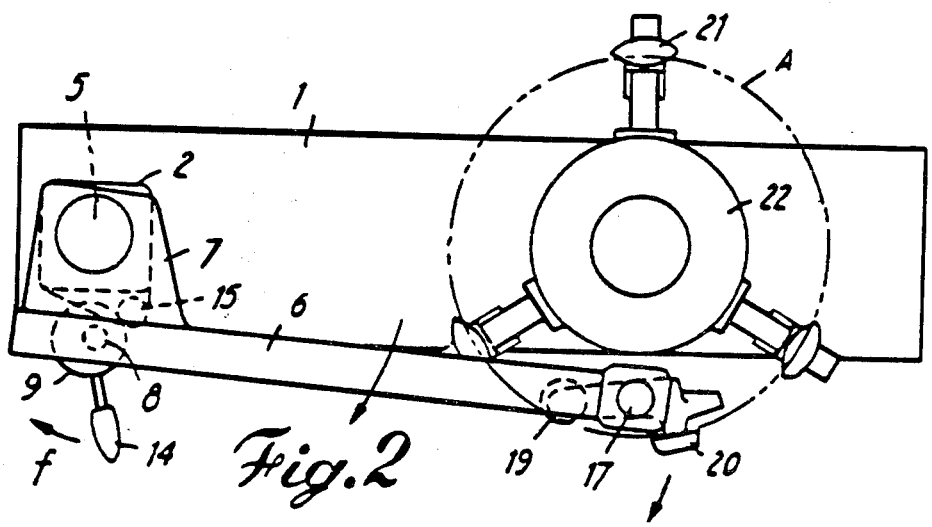
FIG. 2 shows a ground plan.
Figure 3:
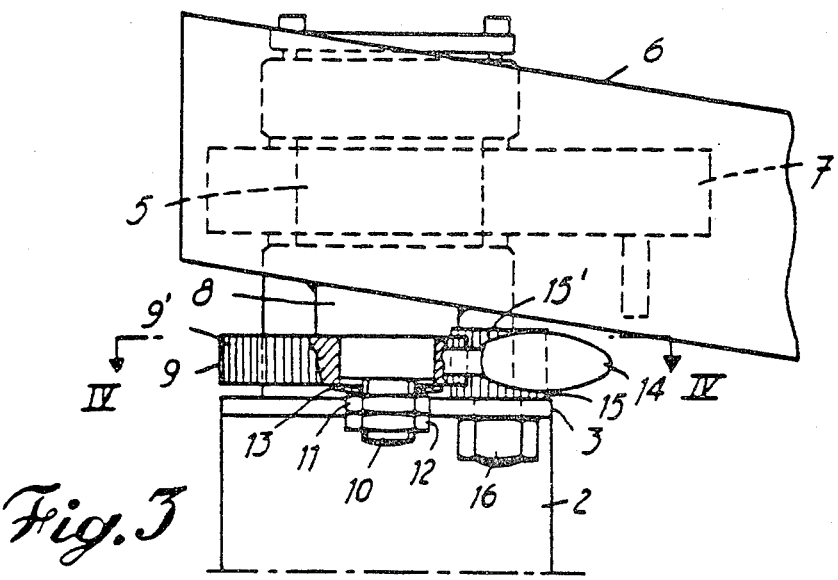
FIG. 3 shows a side view on a larger scale with a partial section of the pivoting part of the arm carrying the tools.
Figure 4:
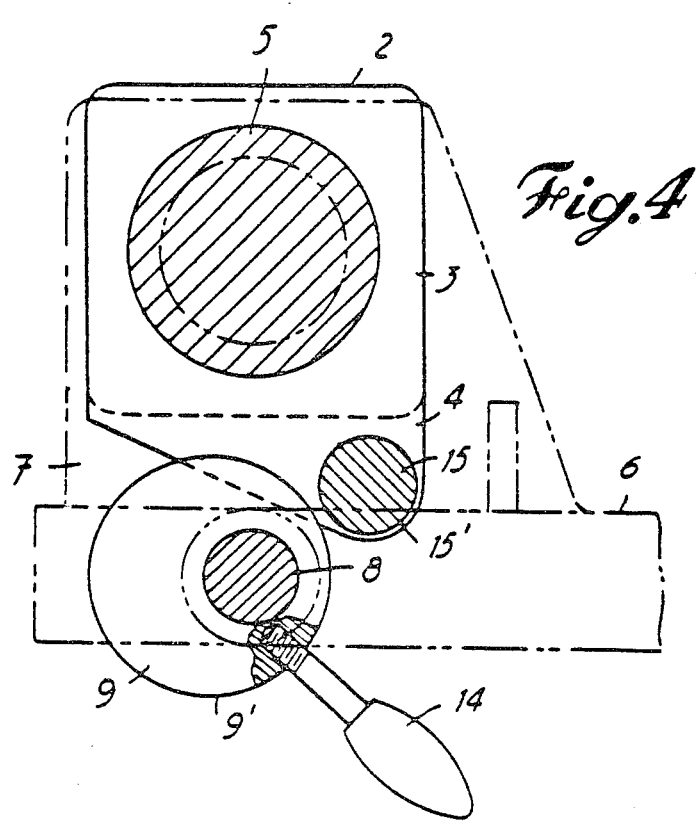
FIG. 4 shows a section along the line IV—IV in FIG. 3.

On the bed-plate 1 is mounted a stationary pillar 2, the top of which is covered by a plate 3 with a protruding part 4. On this plate is mounted a shaft 5 around which can be pivoted an arm 6 fixed to a flange 7. Fixed under this arm 6, there is provided a shaft 8 on which is rotatably mounted an eccentric 9.

The free end of the shaft 8 is provided with a threaded projection 10 on which are screwed a nut 11 and a lock-nut 12. Between the eccentric 9 and the nut 11 there is furthermore provided a spring washer 13. Due to these components, the pressure on the eccentric 9 is adjustable. Thus the eccentric is rotatably mounted between a shoulder of shaft 8 on one side and the spring washer 13 on the other side. The eccentric 9 incorporates a handle 14 allowing one to force the eccentric 9 to turn around the shaft 8. The excentric 9 cooperates with a cylindric stop 15 fixed on the protruding part 4 of plate 3 by means of a nut 16. In order to ensure the efficiency of this cooperation and prevent any unwanted rotation of the excentric, the cooperating surfaces 9' and 15' of the excentric 9 and the stop 15 are slotted vertically. At the front side the pivoting arm 6 carries in the known way the bar 17, the level of which is adjustable, with a carrier 18, carrying the small guiding wheel 19 to separate the bead of the tire and the small pressure wheel 20 which drives the tire into the groove of wheel A whilst the tire is being fitted on. Wheel A is clamped in the known way between the clamps 21 of a plate 22, which is made to revolve.

For fitting on a tire, the tire is placed obliquely above wheel A so that the bead of the tire is already partly located in the groove of the wheel rim. Then the arm 6 is pivoted towards the wheel and the level of the bar 17 is adjusted until the small guiding wheel 19 rests on the wheel and the side of the small pressure wheel 20 contacts the edge of the wheel rim, so that the side of the tire passes under the small pressure wheel 20 and the bead of the tire passes along the circumference of the small guiding wheel 19. If the handle 14 of the eccentric 9 is now being turned in the direction f, the eccentric 9 presses against the stop 15 and moves immediately and without effort the arm 6 over a small distance, resulting in the small pressure wheel 20 being located at a small distance from the wheel rim, so as to avoid any contact with same. When plate 22 with wheel A is made to rotate, the tire is pressed on the wheel rim along the whole of its circumference, any possibility of the rim becoming damaged by the small pressure wheel 20 being excluded. For mounting the other bead of the tire, the procedure is the same. The same advantage is obtained when removing a tire.

It is clear that the form and dimensions, and relative arrangement of the components hereabove described may differ without going outside the scope of the invention.

I claim:

1. An improved appliance for fitting a tire on a rim of a wheel of a vehicle, of the type comprising:
   a bed plate,
   a plate rotatably mounted on said bed-plate,
   clamps on said plate for clamping a wheel,
   a vertical stationary pillar mounted on said bed-plate,
   an arm pivoting around a vertical axis on said pillar in a horizontal plane above said plate,
   a bar extending downwards from said arm,
   a guiding wheel carried at the lower end of said bar and intended to separate a bead of the tire above the wheel rim,
   a pressure wheel carried at the lower end of said bar and intended to drive a bead of the tire into a groove of the wheel rim all along the circumference of the wheel, wherein the improvement comprises an eccentric rotatably mounted between the arm and the pillar for pivoting slightly the arm around its pivot axis with respect to the pillar and so adjusting the position of the pressure wheel at a distance from the rim of the wheel on the plate.

2. The appliance of claim 1, in which
a shaft is mounted on the arm,
the eccentric is rotatably mounted around said shaft,
the eccentric comprises a handle, and
a stop is mounted on the vertical pillar, the eccentric pressing against said stop in order to remove the arm and thus locate the pressure wheel at a small distance from the rim of the wheel on the plate.

3. The appliance of claim 2, in which the stop is of a cylindrical shape.

4. The appliance of claim 2, in which the shaft has a threaded end, the eccentric being rotatably mounted on said shaft between a shoulder of said shaft on one side and a spring washer, a nut and a lock-nut on the other side, said nut and lock-nut being screwed on said threaded end.

5. The appliance of claim 2, in which the eccentric and the stop have cooperating surfaces which are slotted vertically.

6. The appliance of claim 1, in which the pivoting axis of the eccentric is in parallel relationship to the pivot axis of the arm.

* * * * *